Figure 7:
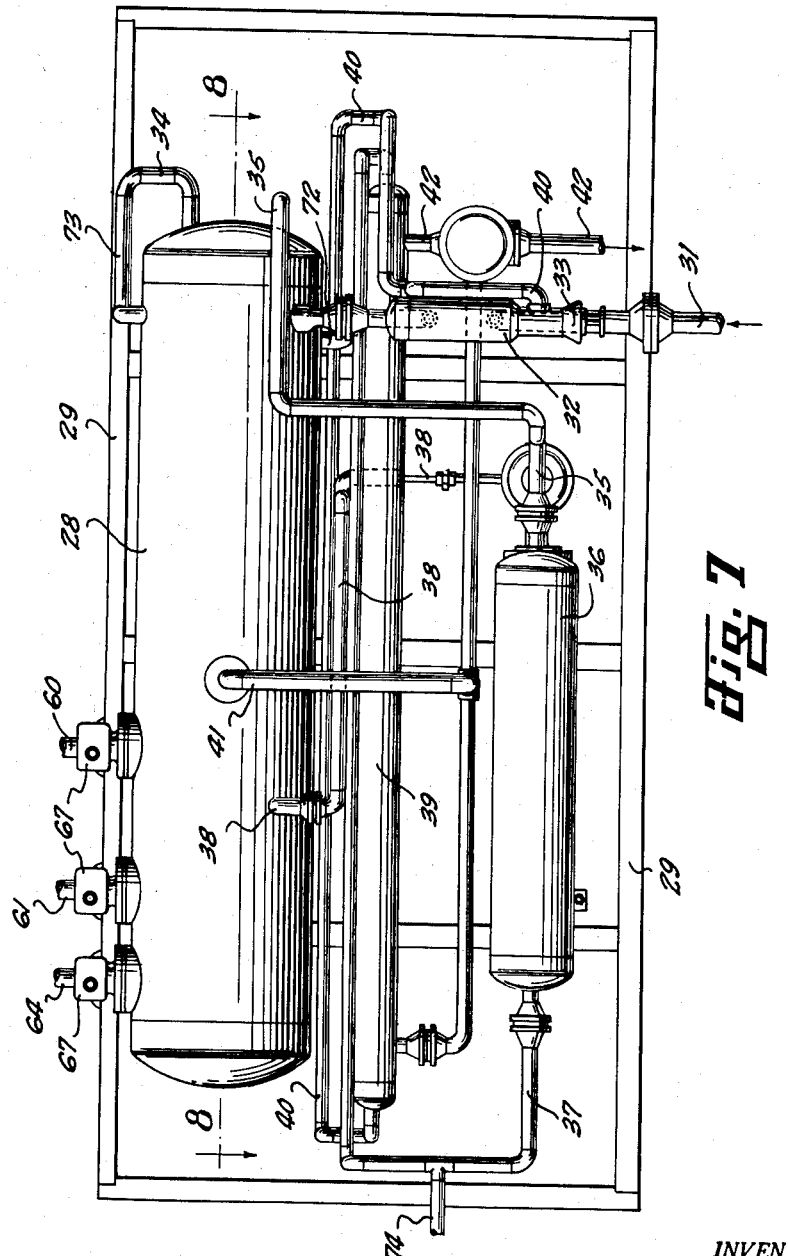

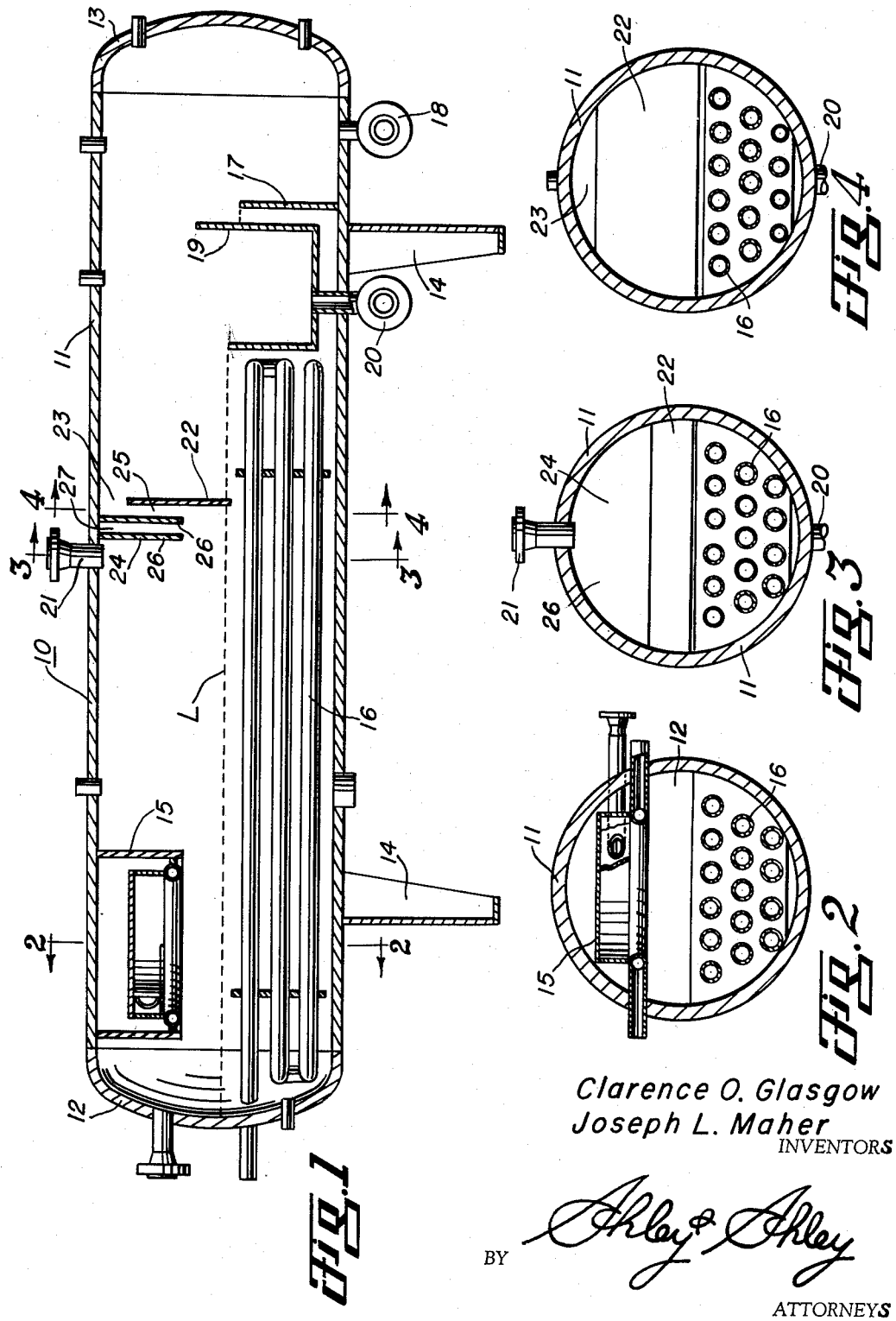

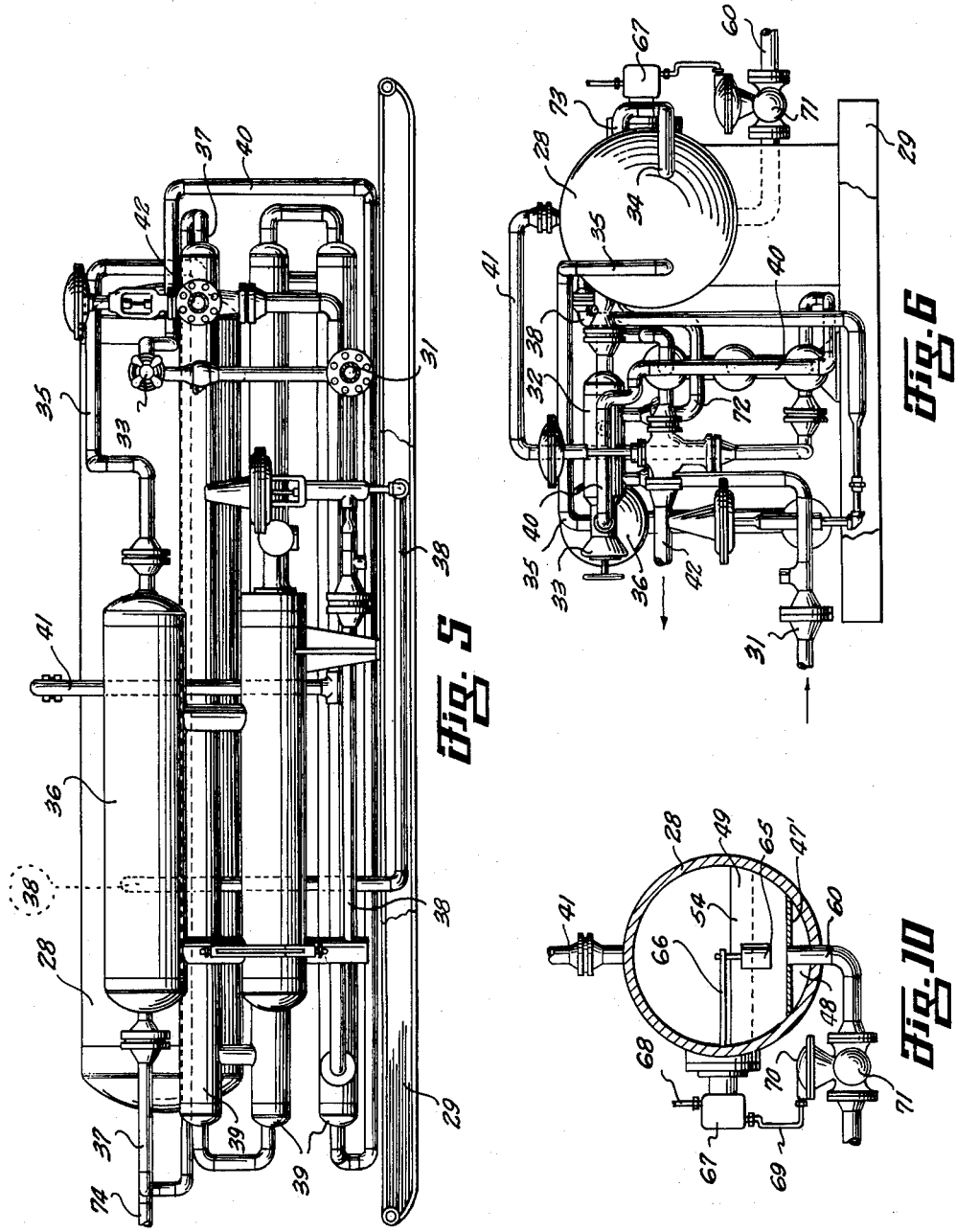

March 13, 1956 C. O. GLASGOW ET AL 2,738,026
LOW TEMPERATURE SEPARATION PROCESS AND UNIT
Filed Nov. 2, 1953 8 Sheets-Sheet 3

INVENTOR.
Clarence O. Glasgow
Joseph L. Maher
BY
Shley & Shley
ATTORNEYS

March 13, 1956  C. O. GLASGOW ET AL  2,738,026
LOW TEMPERATURE SEPARATION PROCESS AND UNIT
Filed Nov. 2, 1953  8 Sheets-Sheet 4

INVENTOR.
Clarence O. Glasgow
Joseph L. Maher
BY
*Shley & Shley*
ATTORNEYS

March 13, 1956  C. O. GLASGOW ET AL  2,738,026
LOW TEMPERATURE SEPARATION PROCESS AND UNIT
Filed Nov. 2, 1953  8 Sheets-Sheet 5
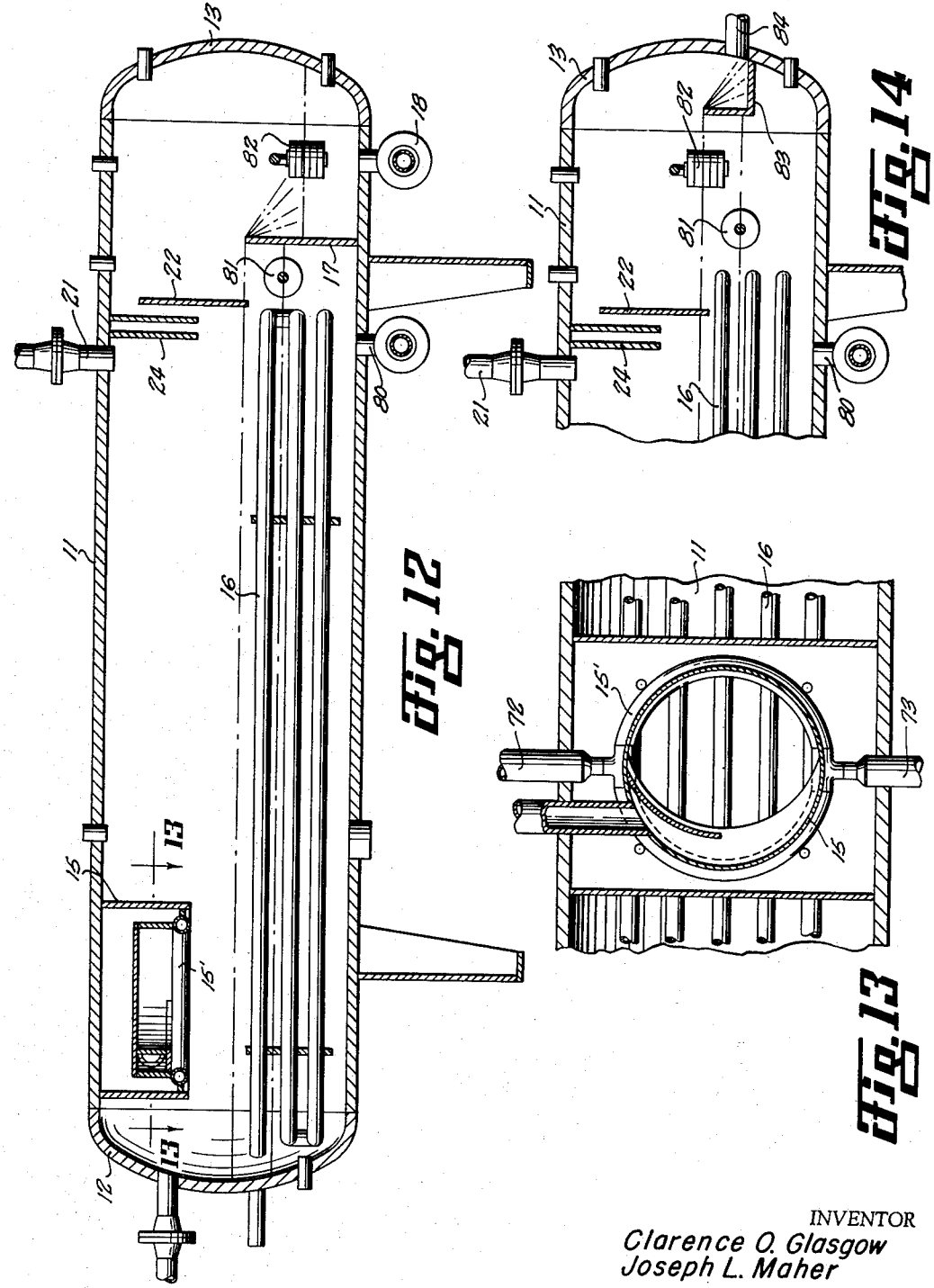
INVENTOR
Clarence O. Glasgow
Joseph L. Maher
BY Shley & Shley
ATTORNEYS March 13, 1956    C. O. GLASGOW ET AL    2,738,026
LOW TEMPERATURE SEPARATION PROCESS AND UNIT
Filed Nov. 2, 1953    8 Sheets-Sheet 6
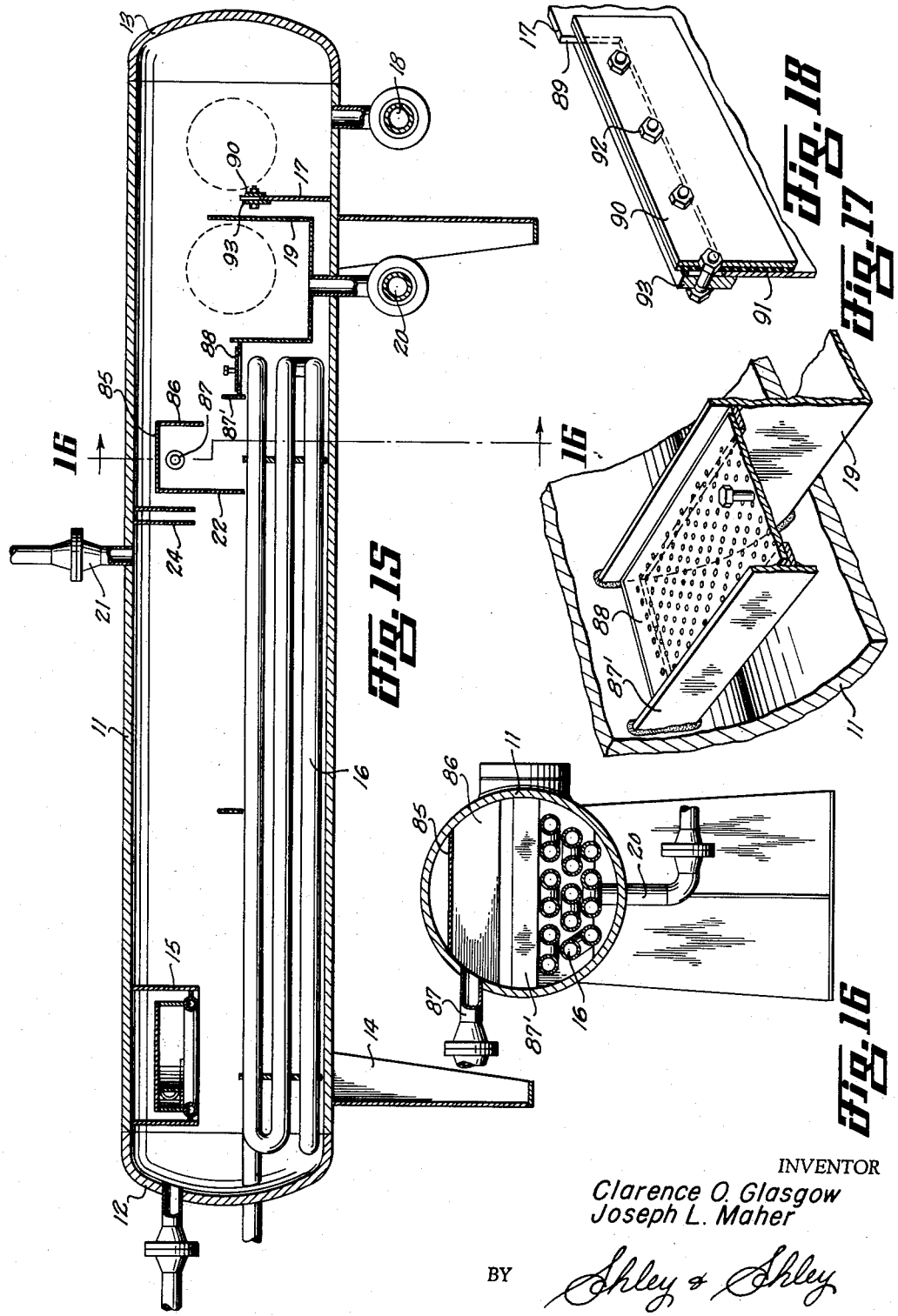
INVENTOR
Clarence O. Glasgow
Joseph L. Maher
BY Shley & Shley
ATTORNEYS

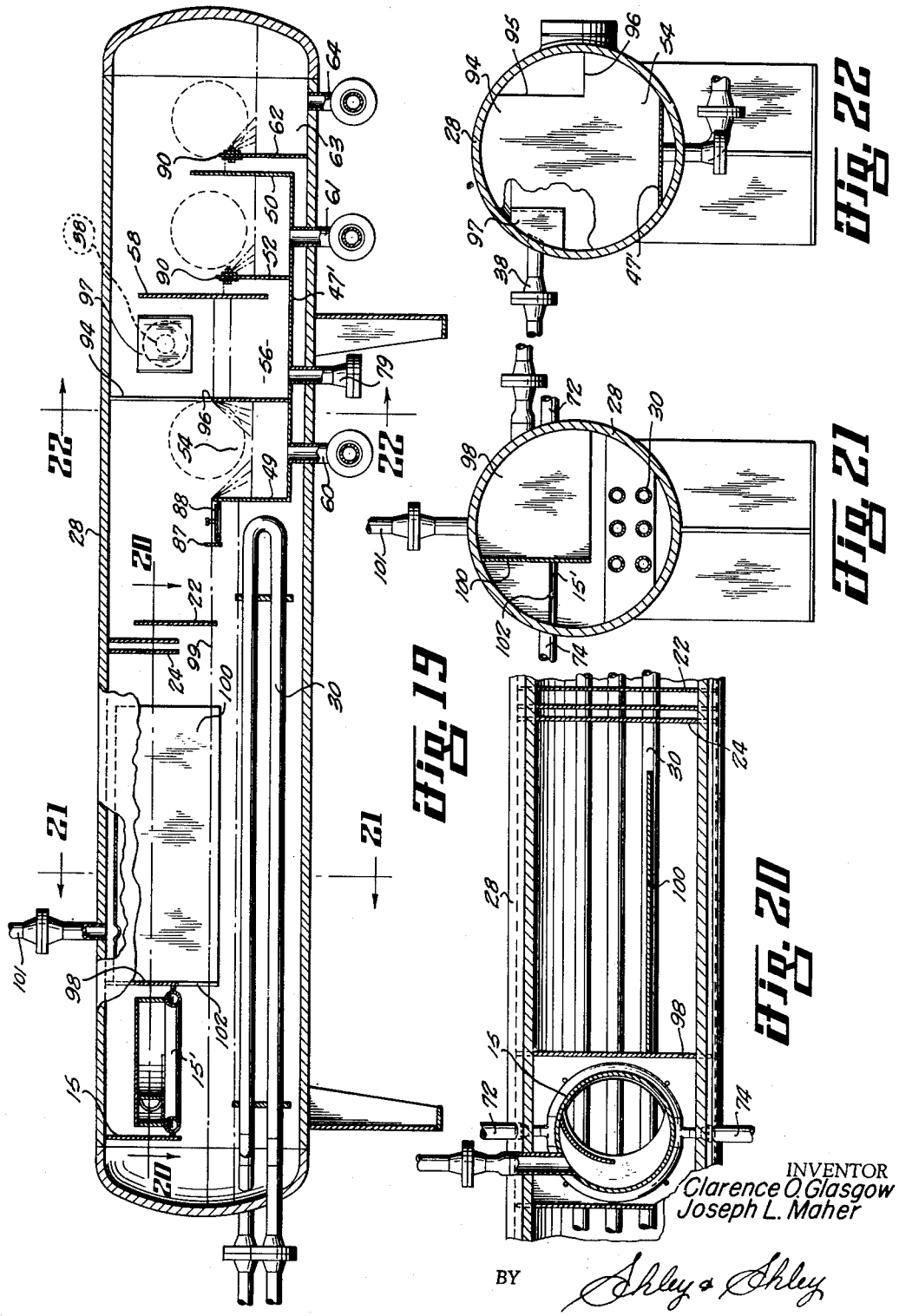

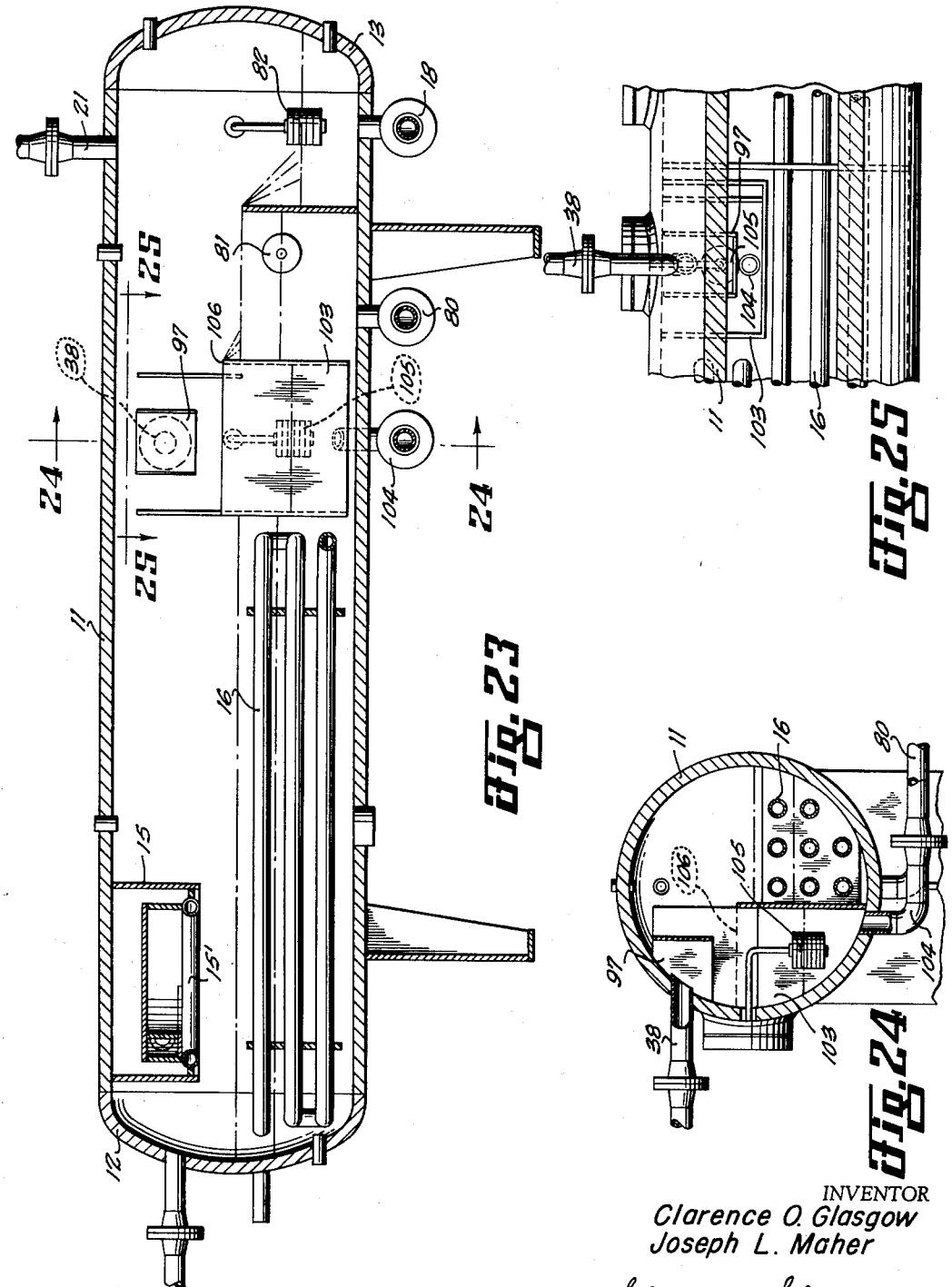

United States Patent Office 2,738,026
Patented Mar. 13, 1956

2,738,026

LOW TEMPERATURE SEPARATION PROCESS AND UNIT

Clarence O. Glasgow and Joseph L. Maher, Tulsa, Okla., assignors to National Tank Company, Tulsa, Okla., a corporation of Nevada Application November 2, 1953, Serial No. 389,536

18 Claims. (Cl. 183—2.7)

This invention relates to new and useful improvements in low temperature separation processes and units.

The invention represents modifications or improvements over the low temperature separation processes and units disclosed in the patent application of Jay P. Walker et al., Serial No. 316,632, filed October 24, 1952. Reference to the above application is made because of the similarity of the units and some similarities of structure. The invention, however, is not limited to use with the units described in the aforesaid application.

The invention is primarily concerned with low temperature separation and low temperature separators as applied to the hydrocarbon-containing fluids produced from oil or petroleum wells, especially those wells producing a high gravity or distillate type petroleum product. It has been found desirable to employ low temperature separation or low temperature separation units, under certain conditions, in the recovery of valuable, condensible hydrocarbons from this type of well production which normally flows at relatively high pressures and contains high percentages of fixed gases such as methane and ethane. It has become conventional to pass such a well stream through a high pressure separator wherein the stream is resolved into its liquid and vapor components or portions, the liquid portion being passed directly to a low temperature separator while the vapor portion undergoes regenerative cooling and pressure reduction or expansion before admission to the low temperature separator. Due to the quite considerable cooling or chilling thus achieved in the vapor portion, considerable quantities of hydrocarbon and aqueous materials are condensed therefrom, this condensed material being separated from the gas stream in the low temperature separator, allowed to stratify, and withdrawn separately. There is thus normally established a body of liquid in the lower portion of the low temperature separator, this liquid being stratified into water and hydrocarbon layers. Above the body of liquid, there is a body of gas at very low temperature, and this body of gas normally travels from the separator inlet to a suitable gas outlet provided in the upper portion of the separator vessel. It is desirable to withdraw the liquid hydrocarbons and the water separately from the vessel in most instances, and in this process the water may be exposed to the extremely cold body of gas so as to cause freezing of the water. Even where the water is not so exposed, it is desirable to withdraw the liquid hydrocarbons from exposure to the body of cold gas prior to their removal from the vessel in order to establish better stabilization of the hydrocarbons by the removal of some dissolved gas therefrom as well as to insure the thawing or melting of any frozen particles which may be present in said liquid hydrocarbons.

Further, whereas heretofore the liquid portion separated in the high pressure separator has been allowed to commingle with the condensates in the low temperature separator, it has now been found advantageous to isolate these two liquid portions, at least initially, in order to avoid the several disadvantages resulting from commingling of the liquids. There are several reasons why isolation of the liquids is of benefit.

The formation fluids in a high pressure, distillate type reservoir are believed to be largely, if not entirely in the gaseous state. There may, however, be present some liquid hydrocarbons, and especially some conate or formation water which contains dissolved salts. Further, when a well is first completed and production thereof is first commenced there will be present in the well quantities of drilling mud and other materials introduced into the well during the drilling operation. For these various reasons, the stream flowing from the well at the ground surface will not always consist of pure hydrocarbons and pure water or water vapor, but may include water having dissolved salts or drilling mud or both therein. In addition, the hydrocarbons may contain some wax or gum which may be precipitated out with the liquids in a high pressure separator, and which might solidify upon exposure to a body of very cold gas.

There is another set of circumstances under which indiscriminate mixing of the various well fluids becomes undesirable which occurs when a glycol, or other agent or antifreeze material or hydrate inhibitor, is added to the well stream for the control of freezing or hydrate formation, or for any other purpose. Low temperature separation systems depend upon a quite large reduction in the temperature of the flow stream to effect condensation of desirable hydrocarbons. This temperature reduction may readily be achieved if the well flowing pressure is sufficiently high, and if the permissible pressure of discharge from the separation system is sufficiently low. Thus, if a system is processing a well stream flowing at 2500 or 2800 pounds per square inch, and is discharging denuded gas into a natural gas pipeline at a pressure of 1000 or 1200 pounds per square inch, there is available a sufficient pressure drop to permit taking advantage of the Joule-Thompson effect and to obtain the desired chilling of the gas stream through pressure reduction. As, however, a well is produced and the flowing pressure thereof decreases, other steps must be taken to obtain the necessary temperature drop in the flow stream. These cooling adjuncts may take the form of natural or artificial refrigeration of the flow stream, or more usually, cooling by regenerative heat exchange. The low temperature separator normally operates at a very low temperature, which may be well below the freezing point of water, and the gas being taken off from this separator for delivery to a pipeline is correspondingly cold. This cold gas may be passed through a heat exchanger and employed therein to chill the incoming gas stream prior to the pressure reduction of the latter, and in this manner adequate cooling of the incoming gas stream may be obtained with a fairly low pressure reduction of the order of several hundred pounds per square inch. This expedient, on the other hand, has its own disadvantage in that natural gas streams under high pressure will form gas hydrates at temperatures well above the freezing point of water. The conventional low temperature separation system is adapted to handle or cope with gas hydrates only within the low temperature separator, and formation of hydrates in the system in advance of the separator will normally cause the components of the system to become clogged with gas hydrate particles and hence become inoperative. The temperatures at which gas hydrates form under given pressures have been reasonably well established, and it is known that the incoming gas stream must not be chilled to a temperature below that at which the gas hydrates will form until just prior to the discharge of the gas stream into the low temperature separator. The formation of hydrates has thus placed a lower limit upon the chilling which may be achieved through regenerative heat exchange. As a solution, diethylene glycol or some other suitable anti-freeze agent or dehydrating agent, has been injected into the gas stream in advance of the heat exchanger in order that the gas stream may be chilled to lower temperatures in the heat exchanger and a greater overall temperature drop obtained. Because of its cost, this inhibiting material, or other additive employed, must be recovered and recirculated in the system. Conventionally, the additive is water miscible and is recovered by a simple reconcentration or evaporation process carried out upon the aqueous material withdrawn from the low temperature separator. The presence of gums or waxes, dissolved salts, drilling mud, and other contaminants in this withdrawn aqueous material greatly impedes the efficient recovery of the inhibitor or additive therefrom, sometimes substantially precluding such recovery, and at other times adversely affecting the efficiency or completeness of such recovery.

Since the inhibitor is injected into the gas stream after it has passed through the high pressure separator, all of the water present in the gas stream at that point is pure water in the vapor state. Quantities of this water are condensed from the gas stream in the low temperature separator and the inhibitor is normally recovered in solution or in a commingled state with this condensed water. The reconcentration of the additive by the evaporation of pure water therefrom does not pose any large problem, and hence, if this latter liquid can be protected against contamination by the liquids recovered in the high pressure separator, the problems encountered in recovery of the inhibitor, as well as in the continued efficient operation of the system may be avoided.

There are further instances in which commingling of the liquid portions recovered in the high pressure separator and the low temperature separator need not be avoided, but in which it is desirable that the liquid removed in the high pressure separator not be exposed to a body of cold gas. It has been found desirable to exclude the high pressure separator liquid from the main portion of the low temperature separator in order to prevent the solidification or separation of gums or waxes from the distillate portion of this liquid, not only to prevent separation and accumulation of the wax in the low temperature separator, but also to prevent the coating and obstructing of the various interior portions and parts of the low temperature separator. Also, drilling mud or other foreign material present in the high pressure separator liquid should be excluded from those portions of the low temperature separator most adversely affected by the accumulation of solid or sediment material.

Still further, as pointed out hereinbefore, increased stabilization of the hydrocarbon liquids is very desirable, and such stabilization is achieved in part by the flowing of the separated gas in an elongate, horizontal path over the surface of the accumulated body of liquids within the low temperature separator. The structural provisions for dividing the gas section of the low temperature separator into cold and warm gas zones, coupled with the necessary inclusion of liquid classifying or separating equipment beneath the warm gas zone, tends to diminish in length that portion of the low temperature separator underlying the cold gas zone and in which a considerable degree of stabilization may be effected. Since the length of flow or of the travel path of the gas over the liquid bears a direct relationship to the degree of stabilization realized, it has been found desirable to insure that the gas does flow in an elongated path and to provide structures and processes by means of which such elongated flow is obtained without inordinately increasing the size or length of the low temperature vessel.

In the present invention, the above and other objectives are accomplished primarily by providing means in the separator vessel for separating the body of cold gas present in the upper portion thereof from at least a portion of the bodies of liquid which are present, this being done most readily by dividing the upper portion of the separator vessel into a cold gas area and a warm gas area. It it therefore, an important object of this invention to provide as an improvement for low temperature separation units having a liquid space in their lower portions and a gas space in their upper portions, means for dividing the gas space into a cold gas area and a warm gas area whereby the liquids may be conducted into proximity with the warm gas area and protected from the undesirable effects resulting from exposure exclusively to a body of cold gas.

A further object of the invention is to provide an improved low temperature separation unit in which better stabilization of the hydrocarbon liquids is obtained.

A particular object of the invention is to provide an improved low temperature separation unit in which separated water is protected against freezing due to exposure to a body of cold gas.

A still further object of the invention is to provide an improved low temperature separation unit having a unique baffle system for dividing the gas space of the separation unit into a cold gas area and a warm gas area.

Yet another object of the invention is to provide an improved low temperature separation unit having means for insuring the melting of any frozen particles which may be present in the separated liquids.

Still another object of the invention is to provide an improved low temperature separation unit of the character described wherein the baffle arrangement is such as to insulate the cold gas area from the warm gas area to minimize heat transfer therebetween; and further, wherein, the insulating medium is continuously reestablished and replenished in order to maintain the insulating function at the desired level.

Another important object of this invention is to provide an improved low temperature separation process and unit wherein the well stream is passed through an initial separation step to remove therefrom all liquids present at that point, and wherein these separated liquids are resolved into their hydrocarbon and aqueous components with the aqueous portion being separately withdrawn and held apart at all times thereafter from other liquids separated in the process or unit.

A particular object of the invention is to provide a method and means of the character described wherein an inhibitor or other additive material may be commingled with the well stream following the separation of liquids therefrom, and may subsequently be recovered and recirculated for further use without interference from the liquids removed in the initial separation step.

Yet an additional object of the invention is to provide a device of the character described in which the well fluids are so handled that any solids or contaminants present therein are excluded from steps in the process or portions of the apparatus wherein the presence of such solids or contaminants would impair the overall operation.

Still another object of the invention is to provide an improved low temperature separation method and means wherein a well stream is separated into a liquid and a vapor portion, the vapor portion is chilled and condensed liquids removed therefrom with the condensed liquids being stratified into hydrocarbon and aqueous layers, and the liquid portion is separately stratified into hydrocarbon and aqueous layers, the hydrocarbon layers being withdrawn together and the aqueous layers being withdrawn separately and individually whereby contamination of the hydrocarbon layers or the aqueous layer removed from the vapor portion by the aqueous layer removed from the liquid portion is avoided.

A still further object of the invention is to provide an improved low temperature separation method and means wherein a well stream is separated into a liquid and a vapor portion and the vapor portion brought into a chilled condition within an enclosure having therein a liquid space in its lower portion and a gas space in its upper portion divided into a cold gas area and a warm gas area, and wherein the liquid initially separated is introduced into the enclosure in the warm gas area so as to prevent the solidification of material therefrom and so as to prevent the settling or accumulation of solid material from said liquid portion in the enclosure in a manner detrimental to the efficient operation thereof.

A pertinent object of the invention is to provide a method and means of the character described wherein the cold fluid stream is caused to flow through an elongate horizontal path within the relatively small confined area in the low temperature separation vessel in order to effect more complete stabilization of the liquid hydrocarbons recovered.

Constructions designed to carry out the invention will be hereinafter described together with other features of the invention.

Figure 8:
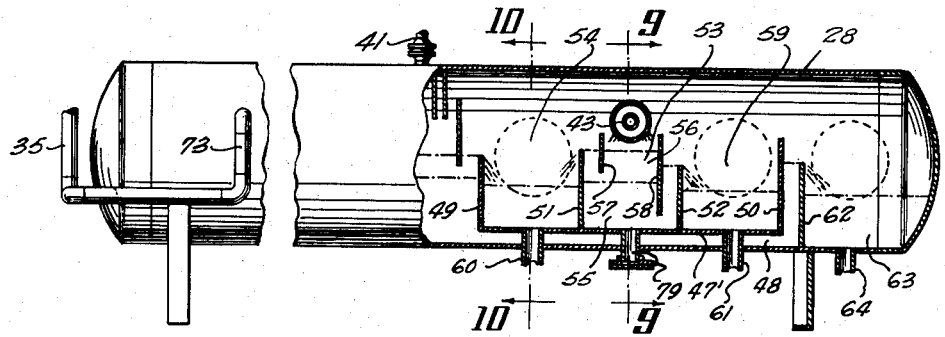
Figure 9:
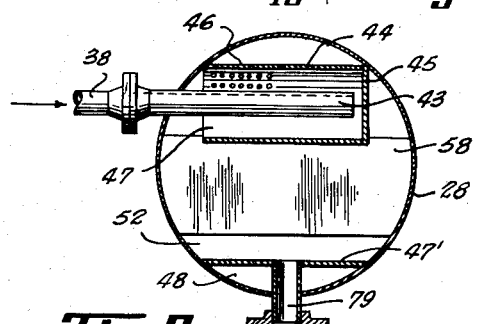
Figure 11:
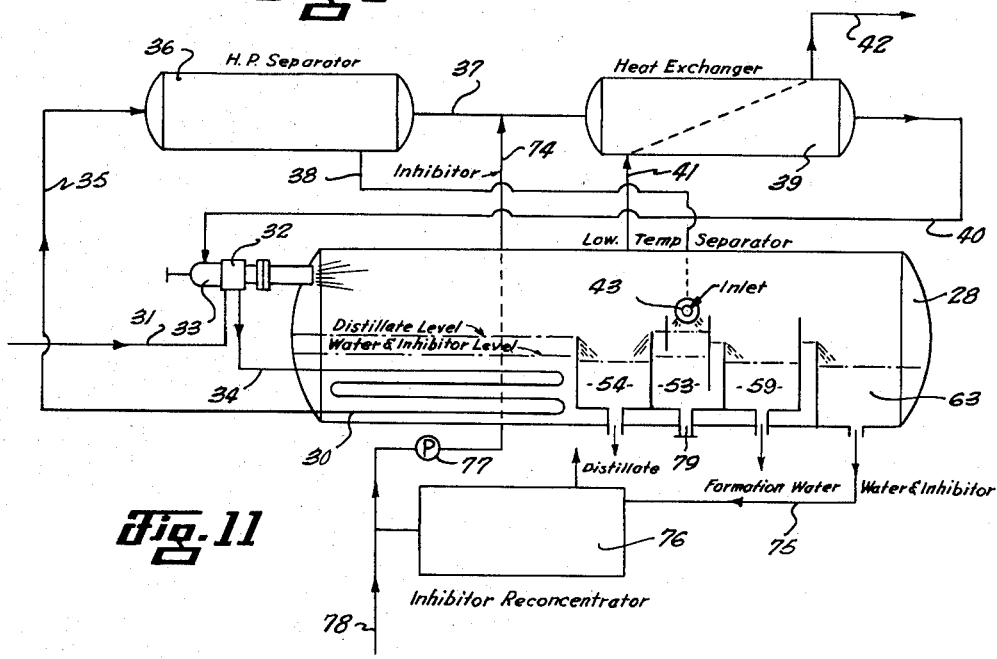

The invention will be more readily understood from a reading of the following specification and by reference to the accompanying drawings, wherein examples of the invention are shown, and wherein:

Fig. 1 is a longitudinal, vertical, sectional view of a low temperature separation unit constructed in accordance with this invention, Figs. 2, 3 and 4 are vertical, transverse, sectional views taken upon the respective lines of Fig. 1, Fig. 5 is a side elevation of a low temperature separation unit constructed in accordance with a modification of this invention and adapted to carry out the methods herein disclosed, Fig. 6 is a righthand end elevation of the separation unit of Fig. 5, Fig. 7 is a plan view of the unit, Fig. 8 is a vertical, longitudinal sectional view of the low temperature separator, the view being taken upon the line 8—8 of Fig. 7, Fig. 9 is a vertical, cross-sectional view taken upon the line 9—9 of Fig. 8, Fig. 10 is a vertical, cross-sectional view taken upon the line 10—10 of Fig. 8, Fig. 11 is a diagrammatic view illustrating the flow diagram of the system, and further illustrating a modification of the method and means herein set forth, Fig. 12 is a longitudinal, vertical, sectional view of a modification of the structure shown in Fig. 1, Fig. 13 is a horizontal, sectional view taken on the line 13—13 of Fig. 12, Fig. 14 is a fragmentary, longitudinal, sectional view of an additional modification of Fig. 1, Fig. 15 is a longitudinal, vertical, sectional view of a further modification of the invention, Fig. 16 is a vertical, cross-sectional view taken on the line 16—16 of Fig. 15, Fig. 17 is an enlarged, fragmentary, view in perspective, partly broken away, showing the foraminous plate structure, Fig. 18 is an enlarged, fragmentary view in perspective, partly broken away, showing the weir plate structure, Fig. 19 is a longitudinal, vertical, sectional view of an additional modification of the invention, Fig. 20 is a horizontal, sectional view taken on the line 20—20 of Fig. 19, Figs. 21 and 22 are vertical, cross-sectional views taken on the respective lines of Fig. 19, Fig. 23 is a longitudinal, vertical, sectional view of an additional modification of Fig. 1, Fig. 24 is a vertical, transverse sectional view taken on the line 24—24 of Fig. 23, Fig. 25 is a horizontal sectional view taken on the line 25—25 of Fig. 23.

This application is a continuation-in-part of our copending application, Serial No. 249,184, now abandoned, filed October 1, 1951, and of the copending application, Serial No. 382,392, filed September 25, 1953, of Joseph L. Maher, applicant herein.

In the drawings, in Fig. 1, the numeral 10 designates a low temperature separation unit which may be of any suitable or desirable type or design. The particular low temperature unit illustrated in the drawing is similar in many respects to that disclosed in the aforementioned application of Jay P. Walker et al., and reference is made to that patent application. In general, the unit includes an elongate cylindrical tank or vessel 11 having its ends closed by suitable heads 12 and 13 and being supported upon legs 14. In the specific embodiment illustrated, the fluid stream enters the vessel 11 near the head 12 through a spinner structure 15, the liquid and solid particles from the stream falling into the lower portion or bottom of said vessel. A suitable heating coil 16 is provided in the lower portion of the vessel for supplying heat thereto and melting gas hydrates or ice particles which may be formed. The liquid water and hydrocarbons of course settle in the bottom or liquid receiving space of the tank 11 and stratify therein in accordance with their respective densities.

At the opposite end of the tank 11, there is provided a transverse upstanding partition 17 which maintains a predetermined water level in the vessel. The water spills over the upper edge of the partition 17 and is removed through a suitable outlet 18.

For maintaining a predetermined hydrocarbon liquid level, there is provided a transverse, rectangular, open-top box or trough 19 extending across the vessel 11 between the baffle 17 and the ends of the heating coils 16. The side wall of the box 19 adjacent the ends of the coils 16 has its upper edge disposed in a horizontal plane above the horizontal plane of the upper edge of the baffle or partition 17, and liquid hydrocarbons may spill over the upper edge of said wall or weir member of the box 19 into the interior of the box. From the box the liquid hydrocarbons are removed through a suitable outlet 20. Of course, any suitable type of controls may be employed for controlling flow through the outlets 18 and 20.

The structure described has been shown in a somewhat simplified manner, and it is not thought necessary to go into all of the details of arrangement and operation. As a background for a more specific description of the present invention, it is felt sufficient to point out that this separation unit operates by reducing the temperature of the flow stream in order that high liquefaction may be obtained. The liquefied water and hydrocarbon components naturally stratify, and provision is made for maintaining a body of these liquids within the vessel. The heating coil immersed in this body of liquids supplies heat for melting the gas hydrates and/or ice particles which may be formed, the ultimate purpose being the removal of the water and hydrocarbon in a liquid state only. Of course, the gaseous hydrocarbons are withdrawn separately as will be described more fully hereinafter.

The incoming flow stream, entering through the spinner structure 15, is ordinarily composed of normally gaseous hydrocarbons, normally liquid hydrocarbons, and water. Of course, the flow stream is usually at an extremely low temperature, and certain of the intermediate hydrocarbons, such as propane, butane, and the like, may be at least partially in a liquid state. The gaseous phase of the flow stream is separated from the liquid and solid phases thereof within the separator vessel 11, and the separated gas, which is very cold, moves longitudinally of the vessel to a suitable gas outlet 21 provided in the upper wall of the vessel 11. The separated liquids also move longitudinally of the vessel and are removed therefrom adjacent the head 13 or proximately near the same whereby the points of removal of the liquid components are disposed at locations displaced from the point of inlet at the spinner structure 15.

At an intermediate point in the general course of movement of the liquids from the inlet to the outlet of the separator structure, the latter is provided with means for dividing or separating the gas space or gas receiving space of the separator vessel into a first or cold gas area or zone and a second or warm gas area or zone. This is done in order that the separated liquids will not be exposed to a very low temperature throughout the entire course of their flow through the separator vessel, and whereby, at or near the point of outlet of the liquids from the vessel, said liquids will be exposed to a body of gas existing at a higher temperature than that present in the immediate vicinity of the spinner structure 15. Although the specific embodiment of the invention illustrated in the drawing discloses one structure for obtaining this desirable end result, it is manifest that other arrangements may be employed for the same purpose.

The particular means disclosed in the drawing for establishing separation of the gas space into areas of two temperatures includes a transverse partition 22 extending vertically within the vessel 11 and across the width thereof at a point between the fluid stream inlet, represented by the spinner structure 15 and the area of liquid outlet, represented by the box 19 and partition 17. The upper edge of the partition 22 terminates short of the upper wall of the vessel 11 to provide a gas flow space or opening 23, while the lower edge of the partition 22 extends below the normal liquid level L established in the vessel 11 by the forward wall of the box 19. The partition 22 thus effectively prevents the movement of gas from the inlet end of the separator vessel to the outlet end thereof except through the opening or gas flow space 23.

An insulating baffle structure 24 depends from the upper wall of the vessel 11 and extends downwardly therein between the partition 22 and the spinner structure 15. As shown in Fig. 3, the baffle 24 extends entirely across the vessel and has its lower edge terminating at a point spaced above the liquid level L. The longitudinal spacing between the baffle 24 and the partition 22 is relatively small so as to provide a somewhat restricted vertical, gas flow passage 25 between the latter two elements. The lower edge of the baffle 24 is disposed an appreciable distance below the upper edge of the partition 22 whereby the passage 25 is caused to be of appreciable vertical dimensions. With this arrangement, gas may flow between the two ends of the separator vessel only by passing through the flow spaces 23 and 25 since all other means of passage are effectively blocked off.

The gas outlet 21 is disposed between the baffle 24 and the spinner structure 15, and is desirably positioned closely adjacent the baffle 24. In this manner, the cold gas separated from the incoming fluid stream is withdrawn through the outlet 21, and is prevented by the baffle 24 and partition 22 from flowing to the liquid outlet end of the vessel. As will appear more fully hereinafter, the gas space between the head 13 and the partition 22 is filled with a body of gas which is relatively warm in comparison to the gas present between the partition and the spinner structure 15, and it is obvious that this body of warm gas will prevent the flow of cold gas upwardly through the passage 25. Because of the greater density of cold gas as compared to warm gas, such flow is effectively eliminated. At the same time, however, complete pressure equalization is maintained between the warm and cold gas areas.

It is to be noted that the heating coils 16 extend toward the outlet end of the vessel past the partition 22, and that there is a portion of the body of liquids present in the vessel subjected to the action of the heating coils in this area without, at the same time, being exposed to the body of cold gas present in the vessel above said body of liquids. Hence, before the liquids spill into the box 19 and over the upper edge of the partition 17, they are subjected to an amplified warming action which brings the liquids more nearly to the temperature at which it is most desirable for them to be withdrawn from the separating vessel.

Because of the coils 16, the stratum of hydrocarbon liquids in the lower portion of the tank is subjected to a stabilizing action which is two-fold in function. The extremely low temperatures which may be present may cause certain of the lighter hydrocarbons to be in a liquid state, and it is desirable that the larger portion of these hydrocarbons be removed from the recovered liquid hydrocarbon or petroleum product. This function is performed by the heating coils 16 which cause some vaporization of the lighter hydrocarbons and result in their evolution into the gas space of the separator structure. At the same time, the body of cold gas in the separator causes the condensation of certain of the heavier hydrocarbons and their return to the liquid phase so that they are not lost through the gas outlet 21.

The provision of the area of amplified warming present in the liquid layers disposed between the partition 22 and the box 19 and in contact with the inner ends of the heating coils 16, carries this stabilizing action a desirable step further and provides even greater stabilization of the liquid product. This is true because the offsetting influence of the body of cold gas is removed and the stable characteristics of the liquid hydrocarbons spilling into the trough 19 is enhanced to facilitate the storage of said hydrocarbons in ordinary stock tanks or vessels.

These vapors rising into the warm gas area of the vessel will be at a temperature somewhat higher than that of the gas in the cold gas area, and hence, the temperature of the warm gas area will be maintained at the desired elevation. It is to be noted that the water also will be warmed and that some relatively warm vapors may arise therefrom into the warm gas area.

Thus, as a first result, the separated liquid hydrocarbons are stabilized to a greater degree and a more desirable product is had.

Another beneficial result of considerable importance is the protection of the separated water and hydrocarbons from extremely low temperatures. This is especially important in the case of the separated water since portions thereof may freeze if exposed to the gas in the cold gas area and cause ultimate stoppage or other malfunctioning of the separation equipment.

A further beneficial result is the assurance that any solid particle of frozen material such as gas hydrates or ice particles which have not been melted in the upstream portion of the separator structure will most certainly be thawed or melted after passing under the partition 22, and hence, the discharge of frozen particles into the trough 19 is effectively prevented.

Since there is evolution of gas in the portion of the separator vessel underlying the warm gas area, said area will be supplied with and maintained full of the evolved warm gas at all times, the excess flowing through the passages or spaces 23 and 25 into the cold gas area. The reduction in temperature in the gas thus entering the cold area will necessarily result in condensation of any water vapors which may be present therein, along with the condensation of desirable liquefiable hydrocarbons, and the resultant treatment of this gas will be the same as that accorded the cool gas flowing directly from the inlet to the gas outlet 21.

It is desirable, but not essential to form the baffle 24 of an insulating nature or structure so that heat transfer between the cold and warm gas areas is prevented. If a single metallic plate were used for the baffle 24, it is obvious that the plate would soon reach the low temperature of the gas in the low temperature gas area, and that because of the contact of the warm, and possibly wet, gas in the warm gas area with the cold plate, condensation and freezing on the plate might well occur. Hence, the baffle 24 should be insulating in nature to prevent this undesirable condensation and freezing.

Any of the conventional insulating materials may be employed for the purposes above described, but it has been found most practical to construct the plate 24 of a pair of closely spaced, parallel plates 26 having therebetween an insulating space 27. The space 27 is open at its bottom, and as warm gas flows downwardly through the passage 25 and spills over the lower edge of the baffle 24, said warm gas will inherently move upwardly into the space 27 to form an insulating barrier therein between the two plates 26. It is manifest that this gas will flow downwardly out of the space 27 as soon as it becomes chilled and will be replaced by additional warm gas. In this manner, the space 27 is kept filled at all times with a body of warm gas which is never allowed to reach too low a temperature because of the inherent convection characteristics of gases existing at different temperatures.

The body of cold gas present in the cold gas area cannot move upwardly into the space 27 because of its greater density and for the same reason that it will not move upwardly into the passage 25. Instead, the partition 22 is constantly bathed with the warm gas, and the latter flows downwardly through the space 25 permitting a portion of said warm gas to flow more or less constantly into the space 27. With this structure and arrangement, the isolation of the warm and cold gas areas is maintained substantially complete, provision is made for gas circulation, and condensation and freezing in the gas space is effectively controlled.

It is further to be noted as an advantage of the particular insulating baffle structure shown for employment as the baffle 24, that no problems of sealing or enclosing a space within the separator vessel are encountered. Of course, an evacuated or dead air space between the pipe 26 might be employed and used to advantage. The provision of such a structure or the filling of the space 27 with a suitable insulating material are contemplated as being within the scope of the present invention. In either case, however, it would be desirable that the space 27 be completely sealed and isolated from the remainder of the interior of the separating vessel, and the illustrated structure possesses the obvious advantage of not requiring such sealing or isolation of the space 27.

In view of the foregoing description, it is to be noted that various of the objectives of the invention have been accomplished with a simple, durable, and economical structure. The liquids being discharged from the separating vessel are protected against excessively low temperatures at their point of discharge, and at the same time, enhanced stabilization of the hydrocarbons is obtained. Further, the complete melting of all frozen particles from the liquid layers is insured, and all these results are obtained without any impairment of the otherwise customary operation of the separation unit as disclosed in the patent application of Jay P. Walker et al. mentioned hereinabove.

In Figs. 5 through 11 of the drawings there is illustrated a modification of the invention in which a high pressure separator, which may or may not be present in the first described form of the invention, is employed in advance of the low temperature separator, and in which liquids from the high pressure separator are introduced into the portion of the low temperature separator underlying the warm gas zone and therein separated or classified as to aqueous and non-aqueous material. In this form of the invention, the numeral 28 designates an elongate, horizontal vessel suitably mounted upon a base or skid 29. The vessel 28 comprises a low temperature separator having a set of heating coils, or other heating means 30 in the lower portion thereof (Fig. 11).

Referring to Fig. 11 to illustrate the process and the general composition of the system herein involved, the well stream, which may consist of liquid, gas, and solid particles or material, flowing under a pressure of a thousand or several thousand pounds per square inch, is admitted through an inlet conductor 31 to the heating jacket 32 of a pressure reducing choke 33. From the jacket 32, the fluid flows by a conductor 34 through the coils 30 and thence through a pipe or conductor 35 to the inlet of a high pressure separator 36. This well fluid will have an appreciable temperature, or may have been artificially heated after leaving the well bore, and hence will be sufficiently warm as to supply heat to the jacket of the choke 33 as well as to the coils or other heating means 30 in the lower portion of the separator vessel 28.

The well stream is separated in the high pressure separator 36 into a gaseous or vapor portion leaving the separator through a pipe 37, and a liquid portion which is drained from the separator through an outlet conductor 38. The vapor portion is conveyed by the pipe 37 to a heat exchanger 39, and from the heat exchanger, the vapor portion flows by a pipe 40 to the inlet of the choke 33. The temperature of the vapor portion is reduced in the heat exchanger and further reduced by the predetermined pressure drop obtained in the choke 33 whereby this portion enters the low temperature separator 28 from the choke in a considerably cooled or chilled condition. As common in this type of system, the chilling results in the condensation of desirable hydrocarbons from the vapor portion, along with the condensation of water and/or the formation of ice or gas hydrates. The gas and liquids are separated in the vessel 28, the cold gas being drawn off through an outlet pipe 41 and conducted through the heat exchanger 39 before discharge through a gas outlet pipe 42 leading to a gas transmission pipe line or other point of disposal of the separated gas. The separated liquids fall to the bottom of the separator 28 into adjacency with the heating means 30 and are thereby warmed so as to melt any ice or hydrates which may be present. It is to be noted that the aqueous portions thus introduced into the separator 28 will consist essentially of pure water since these aqueous portions have been condensed from a vapor state in the vapor portion entering through the choke 33. Hence, this water or aqueous material will be free of solids and foreign matter, dissolved salts and the like.

The liquid portion removed in the high pressure separator 36 is conveyed by the pipe 38 to an inlet pipe 43 (Fig. 9) extending horizontally and transversely of the vessel 28 and positioned in the upper portion thereof remote from the inlet of the choke 33. Since this liquid portion will be flowing under the impetus of the considerable pressure drop existing between the high pressure separator 36 and the low temperature separator vessel 28, it is desirable to provide suitable means for reducing the velocity of flow of the incoming liquid and for bringing said velocity within controllable limits to preclude undue violence and agitation within the separator 28. Any suitable or desirable means may be employed for this purpose, it having been found efficacious to surround the open-ended inlet pipe 43 with a perforated, cylindrical jacket or sleeve 44 having a closed bottom 45 adjacent the open end of the pipe 43 and against which the incoming liquids are jetted. The liquids are thus forced to undergo a complete change of direction, are admitted into a somewhat larger but still confined space within the sleeve 44, and are allowed to pass through the perforations 46 of said sleeve, as well as the open end 47 thereof under reduced and manageable velocities. Obviously, any other suitable or adequate type of inlet means may be employed.

For the purposes of permitting the separate withdrawal of the hydrocarbon and aqueous phases separated from the gas portion of the well stream, as well as permitting the separation and separate handling of the hydrocarbon and aqueous portions entering the separator through the pipe 38, there is provided within the separation zone constituted by the separator 28 an elongate classifier or classification section formed by a plurality of partitions which define a plurality of compartments within the separator. While the classifier is subject to much modification, a specific form thereof is illustrated in Fig. 8 and includes a transverse, horizontal partition or bottom plate 47' extending longitudinally of the vessel 28 and spaced above the bottom thereof to form a shallow flow passage 48 between said bottom plate and the bottom of the separator vessel. The bottom plate 47' extends from a point near the medial portion of the separator vessel to a point near the outlet end thereof opposite the end through which the choke 33 opens, there being an upright, transverse partition 49 projecting upwardly from the medial end of the plate 47', while a similar partition 50 projects upwardly in the separator vessel from the end of the plate adjacent the outlet end wall of the vessel 28.

The inlet pipe 43 extends transversely over the medial portion of the bottom plate 47', the bottom plate carrying a second pair of upstanding, transverse partitions 51 and 52, respectively, which define or partition off a separating sump 53 which underlies the inlet pipe 43. The bottom plate thus carries four upstanding partitions or weir elements which define and form the walls of an open-top trough divided into three compartments or enclosed spaces within the separator 28. These sumps or compartments are each adapted to receive one of the well fluids and to isolate said fluids one from another in order to carry out the purposes of this invention.

The upstanding partitions 49 and 51 enclose a hydrocarbon phase sump 54 into which hydrocarbon liquids flow from the sump 53 and also from the body of liquids in which the heating coil 30 is immersed. As shown in Fig. 8, the upper edge of the partition 49 terminates adjacent the center of the separator vessel 28, and hydrocarbon liquids which are condensed from the vapor portion entering the separator through the choke 33 and which fall into the lower portion of the vessel, accumulate therein and float upon a body of separated water or aqueous material at a level even with the upper edge of the partition 49. As additional hydrocarbon liquids accumulate, the liquids are skimmed over the top edge of the partition 49 and flow into the sump 54. The sump 53, which is adapted to confine a lower strata of water 55 and an upper strata of hydrocarbons 56, contains a pair of vertical, transverse baffle elements, one upon each side of the inlet pipe 43. The baffle 57, adjacent the partition 51, extends from above the surface of the hydrocarbon strata 56 to a point above the interface between the two strata, while the baffle 58, adjacent the partition 52, extends from a point within the water stratum upwardly to substantially the same horizontal plane as the upper edge of the baffle 57. With this arrangement, as liquids fall into the sump 53 from the inlet pipe 43 and stratify into water and oil layers, the oil or hydrocarbons are drawn off beneath the baffle 57 and pass over the upper edge of the partition 51 into the sump 54. The water or aqueous material is withdrawn under the lower edge of the baffle 58 and flows upwardly and over the upper edge of the partition 52 into the sump 59 enclosed between the partitions 50 and 52. The sumps 54 and 59 are provided with suitable discharge pipes 60 and 61, respectively, through which liquids may be withdrawn from these sumps.

The water separated from the incoming vapor portion is drawn off from the lower portion of the separator vessel and flows through the passage 48 beneath the bottom plate 47'. Adjacent the outlet end of the separator 28, and spaced from the partition 50, there is provided an upstanding partition or weir plate 62 projecting upwardly from the bottom of the vessel 28 and terminating in a horizontal plane slightly below the horizontal plane of the upper edge of the partition 49. Thus, the water or aqueous material flowing through the passage 48 may move upwardly and overflow the upper edge of the partition 62 to enter into the sump 63 enclosed between said partition and the end wall of the vessel. These liquids are removed from the sump 63 through an outlet pipe 64.

The discharge of liquids through the three outlets 60, 61 and 64 may be regulated or controlled in any desirable fashion, a preferred structure having been illustrated in Fig. 10. Since the structure for all these sumps is substantially identical, only a typical structure has been shown, this being the discharge arrangement for the sump 54. As illustrated, a float 65 is disposed in the sump and carried upon an arm 66 actuating a conventional pilot valve 67. The pilot valve 67, in turn, regulates the supply of gas or fluid under pressure from a supply pipe 68 to a pipe 69 leading to the diaphragm structure 70 of a diaphragm drain valve 71. In the conventional manner, vertical movement of the float 65 actuates the pilot valve 67 and admits to or excludes from the diaphragm of the valve 71 gas or other pressure fluid to open and close the valve and control the discharge of liquid from the sump to maintain the desired level therein.

While the invention is applicable in all methods and to all units of this type, the arrangement and interconnection of the various system components in a specific embodiment of the invention has further been illustrated in Figs. 5, 6 and 7. For convenience and portability as well as compactness of structure, the system is desirably arranged upon the skid or base unit 29, the low temperature separator 28 being in the form of an elongate, horizontal vessel supported at one side and along one longitudinal edge of said base. As illustrated in the aforesaid figures, and employing so far as possible the same numerals heretofore applied to the system components, the incoming well fluid is introduced into the system through the inlet pipe 31 and flows into the jacket 32 of the variable choke structure 33. The well stream then passes from the jacket by a conductor 72 through the separator vessel 28 in order to supply heat to certain structures therein and described hereinafter (Fig. 13), and then flows by a pipe 73 to the pipe 34 which communicates with the heating coils in the bottom of the separator vessel. From the coils, the fluid exits by the conductor 35 which leads to the high pressure separator 36. From that point, the flow of the various fluids and well stream components is substantially the same as that previously described in connection with Fig. 11, and the same numerals have been applied to Figs. 5, 6 and 7 in order to identify the various portions of the structure.

As pointed out hereinbefore, it sometimes becomes desirable to add an anti-freeze agent or hydrate inhibitor, or other additive material, to the vapor portion of the well stream as the latter is drawn off of the high pressure separator and before it enters the heat exchanger. As shown in Figs. 11 and 7, the inhibitor is introduced into the pipe 37 through a branch connector or conduit 74 whereby the inhibitor or additive is directed into the pipe 37 and commingled with the vapor portion flowing therethrough. Normally, this material, which may be diethylene gycol, triethylene glycol, calcium chloride brine, or other suitable material such as are well known in this art, is water miscible and hence concentrates almost exclusively in the aqueous portion of the flow stream. As the vapor portion is cooled in the heat exchanger, and as it is further cooled in the choke 33, both hydrocarbon and aqueous liquids will condense and the inhibitor or additive will be drawn off from the sump 63 through the outlet 64 along with the aqueous or water phase.

This withdrawn material is conducted by a pipe 75 to an evaporative or reconcentrating unit 76 in which the additive material is recovered for recirculation. In the usual installation, the material flowing to the reconcentrator is a simple mixture of water and an inhibitor such as diethylene glycol, and it is only necessary to supply heat to this liquid mixture to evaporate water therefrom and bring the concentration of glycol up to the desired level. The reconcentrated inhibitor or additive is then simply reintroduced into the pipe 74 by means of a pump 77. As additional quantities of inhibitor become necessary for make-up purposes, this material may be added through a branch conductor 78 suitably connected into the system.

It is quite apparent that should an inhibitor such as diethylene gycol become mixed with water containing dissolved salts, a reconcentration by simple heating and evaporation would not be feasible. Such evaporation would not drive off the dissolved salts and would merely concentrate the salts in the glycol to the point where the inhibitor would not be usable, and such action would take place very rapidly. Similarly, drilling mud, waxes or gums, and other contaminant materials would render the inhibitor unfit for use and prevent the recirculation and reuse of the inhibitor. Due to the cost of these additive materials, it is essential that they be recovered and recirculated in order that an economical operation may be carried out. Otherwise, the cost of the additive would not be offset by the increased recovery of hydrocarbons which would be obtained, and the use of an inhibitor or additive in the system would not be justifiable from a profit viewpoint.

It is further to be noted that the liquid portion removed in the high pressure separator 36 is prevented from commingling with the fluids in the main body of the low temperature separator 28 wherein ice and/or gas hydrates may normally occur. Any foreign matter present in this liquid portion is thus prevented from coating the surfaces of the heating coil 30 or other parts of the apparatus, from concentrating in the interface between the hydrocarbon and water layers and thus preventing adequate heating of the gas hydrates to melt the same, and from otherwise impeding the desired functioning of the system. Instead, this liquid portion, which may carry contaminants, is excluded and held apart from the other fluids in the system and from the other system components or structures, and is so handled that solids or dissolved materials are not afforded an opportunity of interference with proper operation.

Any solids, such as particles of drilling mud, entering the sump 53 will fall to the bottom thereof and may be removed periodically through a drainage outlet 79. Solutes and material in suspension carried into the sump 59 with the aqueous phase will be drained from the sump along with the water and aqueous material through the outlet 61 and hence will not have an opportunity of accumulating within the sump to an extent sufficient to impair operation of the system.

It is desirable, but not essential, that the gas seal baffles of the first-described form of the invention be used in this last modification, and hence, the baffles 24 and the partition 22 have been shown in Fig. 8 of the drawings. As will appear more fully hereinafter, the gas seal or barrier structure may be omitted and yet classification of the liquids from the high pressure separator retained.

In Figs. 12 through 14 of the drawings there are shown modifications of the form of the invention illustrated in Fig. 1 with the similar parts being identified by the same numerals. The modification illustrated in Fig. 12 has the gas outlet 21 and the baffles 22 and 24 moved somewhat closer to the end wall or head 13 of the tank 11, and the box structure 19 is omitted. Thus, the distillate or hydrocarbon skims over the top of the weir plate or partition 17 and is removed through the outlet pipe 18. Provision for the withdrawal of water is made by a drainpipe or conductor 80 extending from the lower portion of the vessel 10 and having therein a suitable valve or other control means (not shown) operated by an interface float 81 positioned between the heating tubes 16 and the partition 17. A conventional float 82 positioned in the sump between the plate 17 and the head 13 may operate a suitable drain valve (not shown) connected into the hydrocarbon drain conductor 18.

In Fig. 14, a similar modification is illustrated, the water being similarly discharged from the vessel 11, and the hydrocarbon skimming into an open top weir box 83, carried by the head 13, and flowing therefrom through an outlet conductor 84.

In these two modifications, exposure of the separated water to the cold gas as well as to the warm gas is avoided, and since the water is covered at all times by a blanket of liquid hydrocarbon, no particular problem of freezing of the water is encountered. The gas seal baffles 22 and 24 may advantageously be applied to this type of separator structure, however, in order to provide a warm gas zone into contact with which the hydrocarbons are brought before ultimate discharge from the separator vessel. A more stable product is produced in this manner, full melting of hydrates is encouraged, and the other recited advantages are obtained. Hence, the invention is applicable to structures in which the water and hydrocarbons are isolated into separate bodies before withdrawal as well as in separator structures wherein the hydrocarbon and aqueous strata are retained and withdrawal of the separate components made from those strata.

As shown in Figs. 12 and 13, the spinner structure 15 carries on its lower portion a heating conductor or coil 15′. It is to this coil that the conductor 72 of Figs. 6 and 7 leads, and pipe 73 leads therefrom. The coil suffices to supply heat, as needed, to the spinner structure.

An additional modification of the invention is illustrated in Figs. 15 through 18, this modification being employed where resolution of the liquids entering the low temperature separator is not desirable or necessary, or where such liquids are resolved into their water and hydrocarbon components exteriorly of the low temperature separator in a separate vessel or enclosure. The structure illustrated is in many respects very similar to that shown in Fig. 1 and includes the elongate vessel 11, the gas inlet structure or spinner 15, the heating coils 16 and the weir box and partition structure 17 and 19. The structure also utilizes the gas outlet 21 and the insulating baffle structure 24.

The baffle 22 is provided at its upper extremity with a transverse, horizontal plate 85 joined thereto and extending across the upper portion of the tank 11. A relatively deep skirt 86 depends vertically in the vessel from the edge of the plate 85 opposite the baffle 22, and a fluid inlet conductor 87 is connected through the wall of the vessel 11 into the zone thus defined between the baffle 22 and the skirt 86. Referring to Fig. 11, it will be seen that the liquids separated in the high pressure separator 36 and conducted therefrom by the pipe 38 are thus admitted to the structure of Fig. 15 through the inlet conductor 87 and are directed downwardly toward the lower portion of the vessel 11 by the skirt and plate structure described. Since this inlet is between the gas seal or baffle structure and the liquid outlets from the separator, this incoming fluid is thus directed into the warm gas zone or area of the low temperature separator and is protected against any adverse effects due to exposure to the body of cold gas present between the spinner drum 15 and the gas outlet 21. With the exception of maintaining the aqueous portion of this liquid entering through the conductor 87 separate from the aqueous portion entering the low temperature separator through the spinner drum structure, the advantages and benefits flowing from this last described modification are the same as those previously described in conjunction with the modification shown in Figs. 7 and 8. The liquids removed in the high pressure separator 36 are thus introduced into a warm area or zone of the low temperature separator and fall directly into the relatively warm liquid strata in the bottom thereof. At that point, the incoming liquids stratify and resolve themselves into hydrocarbon and aqueous layers and are withdrawn from the low temperature separator along with the hydrocarbon and aqueous components separated from the main gas stream.

In order to insure the thorough warming of fluids enter ing through the conductor 87, the structure of the copending application of De Young, et al., Serial No. 244,406, filed August 30, 1951, may advantageously be applied to the form of the invention shown in Fig. 15 by providing a transverse baffle or barrier member 87′ (Fig. 17) extending across the vessel 11 and interrupting the surface of the hydrocarbon layer therein. Since the hydrocarbons cannot flow over the barrier member 87′, they are forced to flow thereunder into close proximity with the heating coil 16, and any cold or solid particles are thus subjected to heat for return to the liquid state. A foraminous or perforated plate 88 may desirably be positioned in a horizontal plane between the barrier member 87 and the weir plate wall of the weir box 19 to impede the passage of solid particles and hold the same in proximity to the heating coil 16 for an adequate liquefying period.

It is also further desirable that the weir member or partition 17 be adjustable in nature in order that the elevation of the water stratum, and accordingly the elevation of the oil and water interface, may be regulated or adjusted as desired within the vessel 11. Such arrangement may desirably by carried out as illustrated in Fig. 18 wherein the partition 17 is provided with an elongate notch or cut out portion 89 in its upper edge, and a vertically adjustable weir sheet or plate 90 releasably clamped to the partition 17 in position to extend across the notch 89. A sealing gasket 91 is desirably provided between the plate 90 and the partition 17, and the plate may be held in place as by the securing bolts 92 extending from the clamping bar 93 which engages the opposite side of the partition 17. Thus, by loosening the bolts 92, the plate 90 may be adjusted vertically in order to regulate the level of the water stratum within the vessel 11.

It is desirable that the cold gas stream entering the separator vessel flow in an elongate horizontal path over the liquids accumulated in the bottom of the separator, but as the quantity of liquid classification appurtenances increases (as illustrated in Fig. 8) and the gas baffles or gas seals are moved longitudinally of the separator vessel toward the gas inlet thereto, this path of travel is necessarily reduced. Hence, it is often desirable to provide means for elongating the path of flow of the incoming gas, and a further modification of the invention for carrying out this desirable function is illustrated in Figs. 19 through 22. This latter modification of the invention bears much similarity to the previously described form illustrated in Fig. 8 and includes the elongate horizontal tank 28 having in its lower portion the heating coil 30, and being provided with the liquid inlet conduit 38 through which liquids separated in the high pressure separator 36 are introduced into the warm zone or area of the separator vessel. The gas seal or barrier baffles 22 and 24 of Fig. 1 are employed for dividing the upper portion of the vessel 28 into a cold gas zone and a warm gas zone, and the liquid sump and weir arrangement of Fig. 8 is employed in the lower portion of the warm gas zone. As shown in Fig. 19, the sump and weir structure is somewhat modified, the weir 49 having associated therewith the barrier member 87 and foraminous plate 88 of Fig. 17, while the weir plates or partitions 52 and 52 have on their upper portions the adjustable weir plate structure 90 of Fig. 18.

In this last modification, the weir plate 51 is somewhat modified, as shown in Figs. 19 and 22 and is replaced by a partition 94 extending vertically within the vessel 28 and projecting upwardly from the bottom plate 47′ to the top and side walls of the vessel 28. The partition 94 is provided at one side of its upper portion with a rectilinear notch or cut-out 95 adjacent the side wall of the tank 28 opposite that through which the conductor 38 enters, the bottom edge 96 of this cut-out being horizontal and disposed at a proper elevation to permit hydrocarbons to skim thereover into the sump 54.

The liquid inlet to this classifier section is also modified as shown in Figs. 19 and 22, the inlet conductor 38 merely extending horizontally through the side wall of the vessel 28 and having its inner end surrounded by a diverter box 97 having an open top and bottom. The velocity of the incoming fluid is thus reduced and dissipated, and the fluid stream diverted upwardly and downwardly for confinement within the sump 56. The plate 58, in conjunction with the plate 94, serves to confine this fluid flow and prevent it from splashing or entering into the adjacent sumps.

Since it is desirable that the overall length of the vessel 28 be kept within reasonable limits, and since the classifier section which has been described occupies a considerable portion of the vessel 28, the horizontal length of the cold gas zone of the vessel is necessarily somewhat restricted.

To achieve the desired provision for elongating the horizontal flow of cold gas through the cold gas zone, the inlet spinner structure 15 of Figs. 1 and 15 is positioned adjacent the end wall or head of the cold zone of the tank and partially isolated from the balance of the cold gas zone by a vertical partition 98 extending from the top of the tank or vessel 28 to below the surface 99 of the hydrocarbon stratum therein. A second vertical partition 100 extends longitudinally of the vessel 28 from the partition 98 to a point near the gas seal baffles 24. As shown in Figs. 20 and 21, the partition 100 is offset laterally from the longitudinal center of the tank 28 whereby the gas outlet conductor 101, which projects upwardly from the top wall of the vessel 28 between the partition 98 and the gas seal baffles 24, may be positioned closely adjacent the partition 98 and yet be in communication with the space on one side only of the longitudinal partition 100. Upon the opposite side of the partition 100, the partition 98 is provided with a notch or cut out portion 102 in its lower edge so that gas entering the vessel through the spinner structure 15 may pass through said notch and above the hydrocarbon surface 99 along the side of the partition 100, around the end of the partition 100, and back along the opposite side of the said partition to exit through the gas outlet conductor 101. In this manner, the length of horizontal travel of the gas stream is somewhat extended without an undue increase in the overall length of the vessel 28. As a further advantage of this structure, gas flowing from the warm gas zone to the cold gas zone between the gas seal baffles 22 and 24 is also caused to pass through a somewhat elongated horizontal path over the separated liquids, and this gas also is subjected to a degree of stabilization. The basic concept and the advantages of elongate horizontal flow of the gas stream over the separated liquids in a low temperature separator are disclosed in the copending application of Jay P. Walker et al., Serial No. 316,632, filed October 24, 1952, referred to hereinbefore.

As hereinbefore pointed out, classification of the liquids entering the low temperature separator from the high pressure separator may be desirable even though provision is not made for division of the gas space of the low temperature separator into cold and warm gas zones. In the structures of Figs. 12 and 14, the water stratum in the low temperature separator is not exposed to the gas space, and hence, freezing of the water is not likely. Nevertheless, the liquids from the high pressure separator, and especially the water therefrom, may carry contaminants which render advantageous the isolation of these liquids from the liquids condensed in the low temperature separator.

In Figs. 23 through 25 of the drawing, is illustrated a further modification of the invention for classifying the liquids entering the low temperature separator from the high pressure separator in the absence of the gas seal or barrier structure. The structure shown is substantially identical to that of Fig. 12, and the same numerals have been employed to identify like parts and elements. The fluid inlet conductor 38 and diverter box 97 of Fig. 22 are included, the conductor 38 opening into the separator vessel 11 through the side wall thereof adjacent the outlet end of the vessel. The diverter 97 overlies, within the vessel 11, an open-topped box or sump 103 positioned at one side of the vessel, as shown in Figs. 24 and 25, so that fluids entering through the conductor 38 enter directly into the box. At the same time, the water and hydrocarbon strata extend past the box to the outlet end of the vessel 11 so that liquids may be withdrawn from said strata as illustrated in Figs. 12 and 14. The liquids entering the box or enclosure 103 stratify therein into water and hydrocarbon layers. The water is drawn off through an outlet 104 extending from the bottom of the box and controlled by an interface float 105 in the box. The hydrocarbons may be separately withdrawn from the box, or may be skimmed over one shorter side wall 106 thereof to commingle with the hydrocarbon layer in the main portion of the vessel 11.

All of the copending applications to which reference is made herein are owned by applicant's assignee.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. A low temperature separation unit including, a vessel adapted to contain a body of liquid in the lower portion thereof and a body of gas in the upper portion thereof, substantially vertical baffle means in the upper portion of the vessel defining therein a first gas area and a second gas area, a cold fluid inlet to the first gas area of the vessel so as to establish therein a cold gas zone, a gas outlet from the cold gas zone, heating means in the lower portion of the vessel for supplying heat to liquid present therein, and a liquid outlet from the vessel underlying the second gas area, whereby warmed liquid flowing to the liquid outlet supplies heat to the second gas area so as to establish therein a warm gas zone.

2. A low temperature separation unit including, a vessel having a liquid receiving space in the lower portion thereof and a gas receiving space in the upper portion thereof, substantially vertical baffle means in the gas receiving space defining therein first and second gas areas overlying the liquid receiving space, heating means in the liquid receiving space for warming liquid present therein and supplying heat via the warmed liquid to the second gas area so as to establish in the second gas area a warm gas zone, a cold fluid inlet to the first gas area of the vessel so as to establish therein a cold gas zone, a gas outlet from the cold gas zone, and a liquid outlet from the liquid receiving space.

3. A low temperature separation unit as set forth in claim 2, wherein the baffle means includes a partition extending from a point below the upper boundary of the liquid receiving space to a point spaced below the upper boundary of the gas receiving space, and a baffle spaced from the partition and extending from a point above the upper boundary of the liquid receiving space to the upper boundary of the gas receiving space.

4. A low temperature separation unit as set forth in claim 2, wherein the baffle means includes a partition extending from a point below the upper boundary of the liquid receiving space to a point spaced below the upper boundary of the gas receiving space, and an insulating baffle spaced from the partition and extending from a point above the upper boundary of the liquid receiving space to the upper boundary of the gas receiving space.

5. A low temperature separation unit as set forth in claim 2, wherein the baffle means includes a partition extending from a point below the upper boundary of the liquid receiving space to a point spaced below the upper boundary of the gas receiving space, and an insulating baffle spaced from the partition and extending from a point above the upper boundary of the liquid receiving space and below the upper extremity of the partition to the upper boundary of the gas receiving space.

6. A low temperature separation unit as set forth in claim 2, wherein the baffle means includes a partition extending from a point below the upper boundary of the liquid receiving space to a point spaced below the upper boundary of the gas receiving space, and a baffle spaced from the partition and extending from a point above the upper boundary of the liquid receiving space to the upper boundary of the gas receiving space, said baffle including a pair of spaced plates enclosing an insulating space open at its bottom to the interior of the vessel.

7. A low temperature separation unit as set forth in claim 2, wherein the baffle means includes a partition extending from a point below the upper boundary of the liquid receiving space to a point spaced below the upper boundary of the gas receiving space, and a baffle spaced from the partition and extending from a point above the upper boundary of the liquid receiving space to the upper boundary of the gas receiving space, the baffle being spaced from the partition toward the cold gas zone.

8. A low temperature separation unit including, a vessel having a liquid receiving space in its lower portion and a gas receiving space in its upper portion, means for maintaining a hydrocarbon liquid level in the liquid receiving space of the vessel, means for maintaining a water level in the liquid receiving space of the vessel, heating means in the latter space for supplying heat to liquid present therein, substantially vertical baffle means dividing the gas receiving space into first and second gas areas, a portion of the liquid receiving space underlying and being exposed to the second gas area whereby warmed liquid in said portion supplies heat to the second gas area so as to establish therein a warm gas zone, means in the latter portion for drawing off water, means in the liquid receiving space for drawing off hydrocarbon liquid, a cold fluid inlet to the portion of the vessel containing the first gas area so as to establish therein a cold gas zone, and a gas outlet from the cold gas zone.

9. A low temperature separation unit as set forth in claim 8, wherein the baffle means includes a partition extending from a point below the upper boundary of the liquid receiving space to a point spaced below the upper boundary of the gas receiving space, and an insulating baffle spaced from the partition and extending from a point above the upper boundary of the liquid receiving space to the upper boundary of the gas receiving space.

10. A low temperature separation unit as set forth in claim 8, wherein the baffle means includes a partition extending from a point below the upper boundary of the liquid receiving space to a point spaced below the upper boundary of the gas receiving space, and a baffle spaced from the partition and extending from a point above the upper boundary of the liquid receiving space to the upper boundary of the gas receiving space, said baffle including a pair of spaced plates enclosing an insulating space open at its bottom to the interior of the vessel.

11. A low temperature separation unit as set forth in claim 2, wherein the baffle means includes a baffle extending from a point adjacent and above the upper boundary of the liquid receiving space to the upper boundary of the gas receiving space.

12. A low temperature separation unit as set forth in claim 8, wherein the baffle means includes a baffle extending from a point adjacent and above the upper boundary of the liquid receiving space to the upper boundary of the gas receiving space.

13. The low temperature separation process for petroleum well streams including, initially separating the well stream into a vapor portion and a liquid portion, cooling and introducing the vapor portion into the cold gas zone of a separator enclosure having a liquid space and a gas space divided into a cold gas zone and a warm gas zone, flowing liquid separated from the vapor portion in the separator enclosure to the liquid space and beneath the warm gas zone, supplying heat to the latter liquid, introducing the liquid portion into the warm gas zone and therein separating the liquid portion into hydrocarbon and aqueous liquids, withdrawing separated liquids from the separator enclosure, and withdrawing individually from the separator enclosure the aqueous liquid separated from the liquid portion.

14. The low temperature separation process for petroleum well streams including, initially separating the well stream into a vapor portion and a liquid portion, cooling the vapor portion to condense liquids therefrom, separating condensed liquids from the cold gas, withdrawing the cold gas, supplying heat to the condensed liquids to warm the same, flowing the warmed condensed liquids from proximity to the cold gas and withdrawing warm gas from said liquids, commingling the warm gas with the cold gas, introducing the liquid portion into the warm gas and separating the liquid portion into hydrocarbon and aqueous liquids, withdrawing separated liquids, and separately withdrawing the aqueous liquid separated from the liquid portion.

15. The low temperature separation process for petroleum well streams including, initially separating the well stream into a vapor portion and a liquid portion, cooling the vapor portion to condense liquids therefrom, separating condensed liquids from the cold gas, withdrawing the cold gas, supplying heat to the condensed liquids to warm the same, flowing the warmed condensed liquids from proximity to the cold gas and withdrawing warm gas from said liquids, commingling the warm gas with the cold gas, introducing the liquid portion into the warm gas and separating the liquid portion into hydrocarbon and aqueous liquids, and withdrawing separated liquids.

16. A low temperature separation unit including, an initial separator into which a petroleum well fluid is introduced and separated into vapor and liquid portions, a vessel adapted to contain a body of liquid in the lower portion thereof, substantially vertical baffle means in the upper portion of the vessel defining therein a first gas area and a second gas area, a vapor portion conductor leading from the initial separator to the first gas area of the vessel, cooling means in said conductor so as to establish in the first gas area a cold gas zone, a gas outlet from the cold gas zone, heating means in the lower portion of the vessel for supplying heat to liquid present therein, a liquid outlet from the vessel underlying the second gas area, whereby warmed liquid flowing to the liquid outlet supplies heat to the second gas area so as to establish therein a warm gas zone, and a liquid portion conductor leading from the initial separator to the warm gas zone.

17. A low temperature separation unit as set forth in claim 2, and a vertical partition in the cold gas zone of the vessel dividing the cold gas zone into an elongate gas flow passage doubled upon itself, the cold fluid inlet being positioned at one end of the passage and the gas outlet being positioned at the other end of the passage.

18. A low temperature separation unit as set forth in claim 2, wherein the cold fluid inlet and the gas outlet are positioned adjacent one another and remote from the vertical baffle means, and a vertical partition in the cold gas zone of the vessel extending between the cold fluid inlet and the gas outlet and to a point spaced from the vertical baffle means whereby the vertical partition defines in the cold gas zone an elongate flow passage between the cold fluid inlet and the gas outlet.

References Cited in the file of this patent

UNITED STATES PATENTS

| | | |
|---|---|---|
| 2,528,028 | Barry | Oct. 31, 1950 |
| 2,665,565 | Parks | Jan. 12, 1954 |
| 2,671,322 | Barry | Mar. 9, 1954 |
| 2,690,814 | Reid | Oct. 5, 1954 |